United States Patent
Bristol et al.

(10) Patent No.: US 9,128,976 B2
(45) Date of Patent: *Sep. 8, 2015

(54) OFFLINE RESTRUCTURING OF DEDB DATABASES

(71) Applicant: BMC Software, Inc., Houston, TX (US)

(72) Inventors: Larry J. Bristol, Bellville, TX (US); Bruce H. Mansur, Dripping Springs, TX (US); William P. Kimball, Houston, TX (US); Thomas E. Simms, Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,563

(22) Filed: Feb. 20, 2014

(65) Prior Publication Data

US 2014/0172786 A1 Jun. 19, 2014

Related U.S. Application Data

(63) Continuation of application No. 12/563,637, filed on Sep. 21, 2009, now Pat. No. 8,700,566.

(51) Int. Cl.
*G06F 17/30* (2006.01)

(52) U.S. Cl.
CPC ........ *G06F 17/30374* (2013.01); *G06F 17/303* (2013.01); *G06F 17/30306* (2013.01)

(58) Field of Classification Search
CPC .......................... G06F 17/303; G06F 17/30374
See application file for complete search history.

(56) References Cited

U.S. PATENT DOCUMENTS

| | | | |
|---|---|---|---|
| 5,991,761 A | 11/1999 | Mahoney et al. | |
| 6,691,121 B1 | 2/2004 | Heronimus et al. | |
| 7,809,762 B1 | 10/2010 | Parker et al. | |
| 2003/0135478 A1 | 7/2003 | Marshall et al. | |
| 2005/0240638 A1 | 10/2005 | Fisher | |
| 2008/0307429 A1 | 12/2008 | Fontaine et al. | |

OTHER PUBLICATIONS

IBM, "IMS Administration Guide: Database Manager Version 8"—Feb. 27, 2004, [retrieved from the internet Sep. 30, 2014], retrieved from URL <http://www-05.ibm.com/e-business/linkweb/publications/servlet/pbi.wss?CTY=US&FNC=SRX&PBL=SC27-1283-02>.*

Jantti, "Reorganizing Databases Using IMS Tools"—Dec. 2003, [retrieved from the internet Oct. 9, 2014], retrieved from URL<http://www.redbooks.ibm.com/redbooks/pdfs/sg246074.pdf>.*

IBM, IMS V12 Database Administration, May 2012, pp. 1-2, http://pic.dhe.ibm.com/infocenter/dzichelp/v2r2/topic/com.ibm.ims12.doc.dag/ims_addsecindexexistingdedb.htm.

* cited by examiner

*Primary Examiner* — James Trujillo
*Assistant Examiner* — Giuseppi Giuliani

(57) ABSTRACT

An IMS DEDB database restructure operation creates an empty offline DEDB having the desired structure. The offline database is populated with data from a source (online) database while keeping the source database online (i.e., available for access and update operations). Updates to the source database made during this process are selectively processed in parallel with the offline DEDB load operation. When the contents of the offline database is substantially the same as the source or online database, the source database is taken offline, final updates to the offline database are applied whereafter the offline database is brought online, thereby replacing the source database. It is significant to note that updates occurring to the source or online DEDB are applied to the offline DEDB.

20 Claims, 7 Drawing Sheets

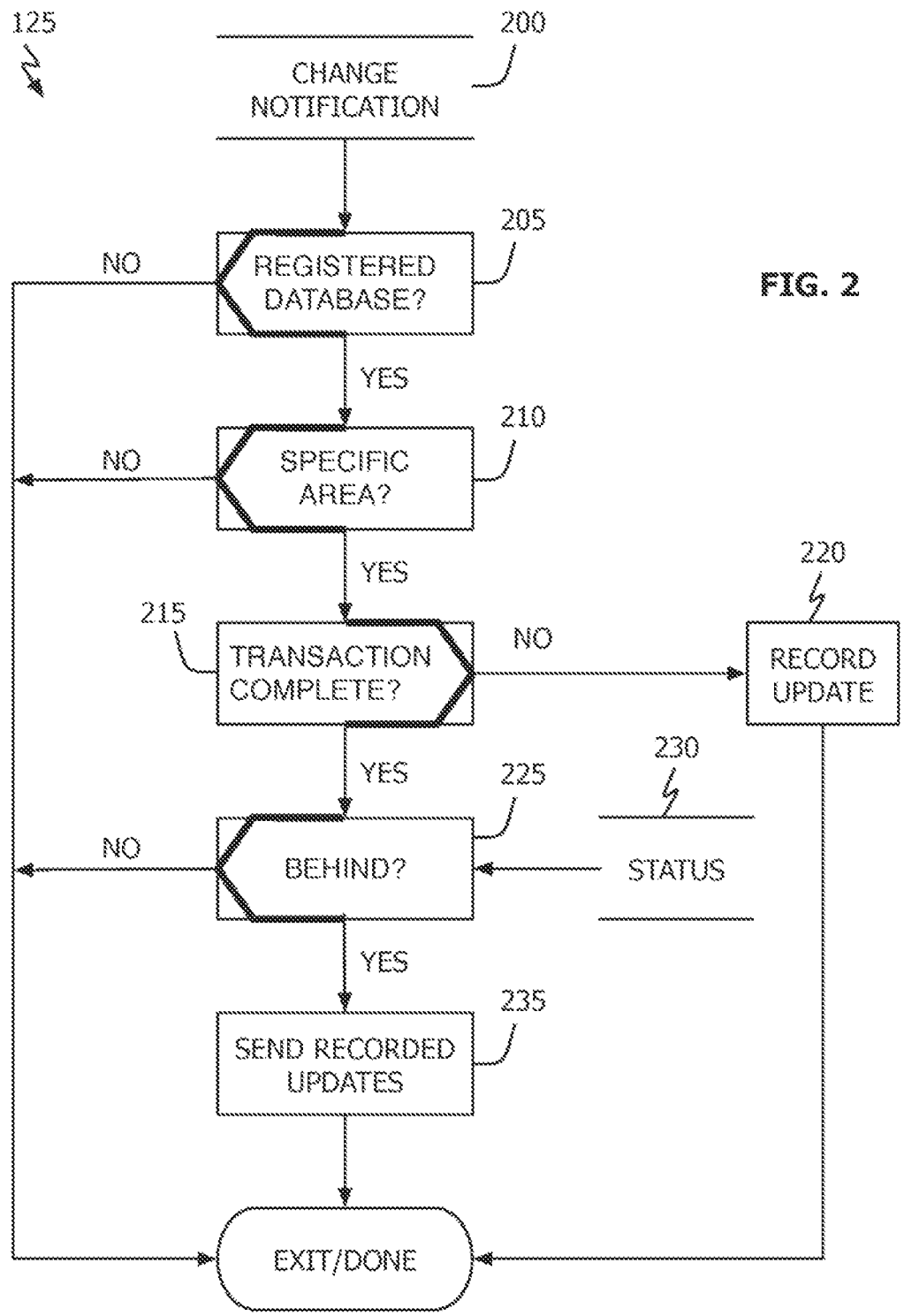

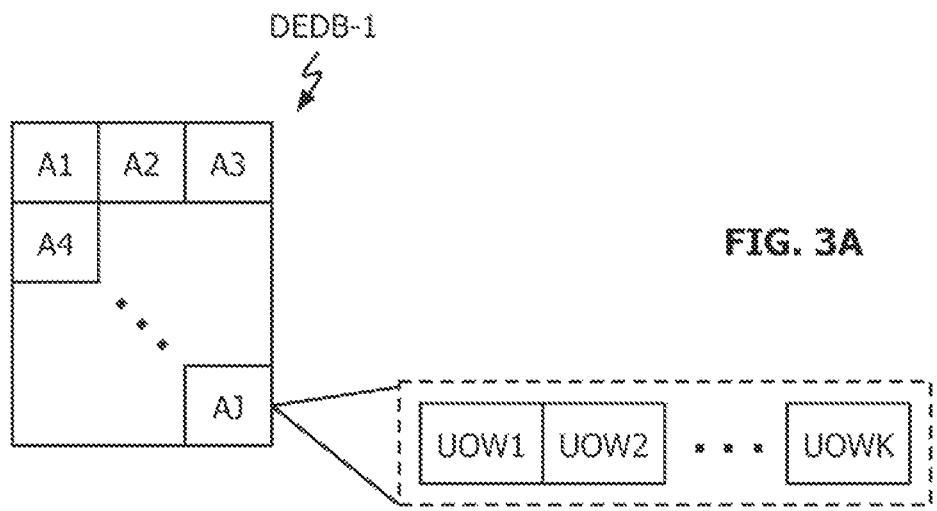
FIG. 3A
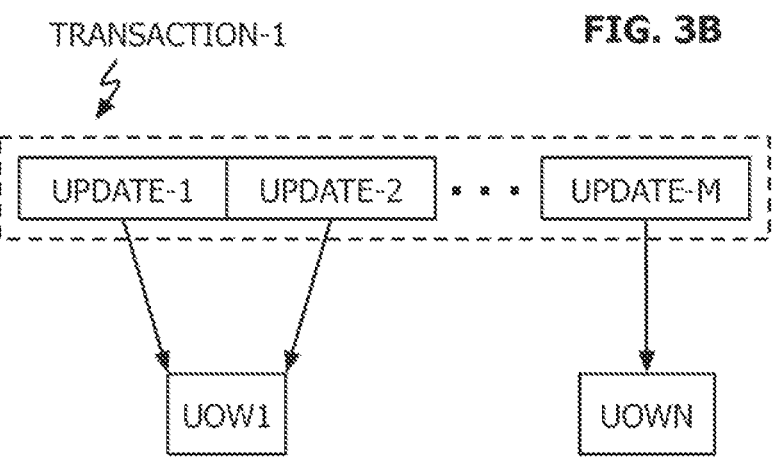
FIG. 3B
| UOW1 | UOW2 | UOW3 | UOW4 | UOW5 | UOW6 |
|------|------|------|------|------|------|
| UOW7 | UOW8 | UOW9 | · · · | | UOW(JxK) |
FIG. 3C

OFFLINE RESTRUCTURING OF DEDB DATABASES

CROSS-REFERENCE TO RELATED APPLICATIONS

This application is a continuation of U.S. application Ser. No. 12/563,637, filed Sep. 21, 2009, entitled "Offline Restructuring of DEDB Databases," which is hereby incorporated by reference.

BACKGROUND

The invention relates generally to database and database management system operations. More specifically, the invention relates to updating an offline IMS Fast Path DEDB database.

The IBM Information Management System (IMS) is a joint hierarchical database and information management system. There are three basic forms of IMS databases: (1) Full Function; (2) High Availability Large Databases; and (3) Fast Path. Full function databases can have both primary and secondary indexes, employ a variety of access methods and can store data using Virtual Storage Access Methods (VSAM) or Overflow Sequential Access Methods (OSAM). High Availability Large Databases are an extension of IMS Full Function databases and were introduced to provide better availability, handling of extremely large data volumes and online reorganization to support continuous availability, Fast Path databases were designed to be continuously online and are optimized for extremely high transaction rates. That is, Fast Path databases are functionally focused on data acquisition or capture rather than query response. Fast Path databases do not support indexes and, for the most part, are implemented using Data Entry Databases (DEDBs). Fast path DEDBs can only be built atop VSAM and are direct-access databases that consist of one or more areas, with each area containing both root segments and dependent segments, While DEDBs are designed to be continuously available., there are times when one must be taken offline. For example, structural changes in a DEDB's schema can only be made to an offline database. While offline, however, there is currently no mechanism to update a DEDB. Thus, if a DEDB is to be modified it must currently be made unavailable to users. The time required to make structural changes may be large and the concomitant loss of access to the database can pose a heavy financial burden on the database's owner. Thus, it would be beneficial to provide a means to restructure a DEDB database while it is offline,

SUMMARY

In one embodiment the invention provides a method to restructure an online IMS DEDB database. The method includes identifying the structure of the online DEDB that is to be restructured. An offline DEDB is then instantiating having the desired structure and data from the online DEDB is copied into it Modifications to the online DEDB occurring during the act: of copying data from the online to offline DEDB are Identified and applied to the offline DEDB. Once fully populated with data, the offline DEDB is then swapped for the online DEDB and, itself, taken online. The result is a DEDB having the desired structure and-a of the original online DEDB's information, In another embodiment, a computer executable program to implement the aforementioned method may be stored in any tangible media that is readable and executable by a computer system. In yet another embodiment, a networked computer system may be programmed so that, collectively, all of the computer systems comprising the network of computers perform the aforementioned method.

BRIEF DESCRIPTION OF THE DRAWINGS

FIG. 2 shows, in flowchart form, a change capture process in accordance with one embodiment of the invention.

FIGS. 3A-3C show the internal structure of an illustrative IMS database,

DETAILED DESCRIPTION

Figure 1:
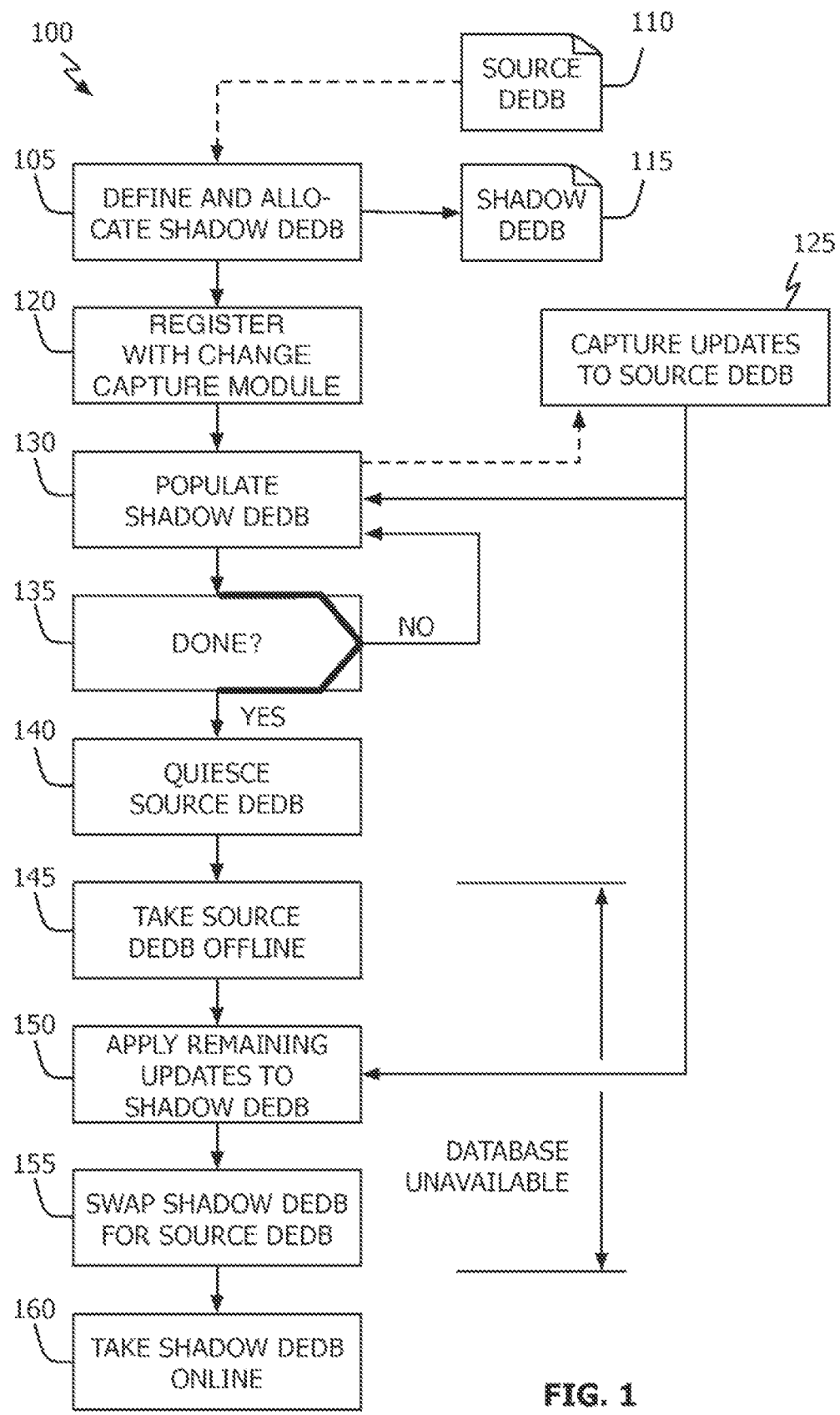
FIG. 1 shows, in flowchart form, an IMS DEDB update method in accordance with one embodiment of the invention.

In general, the invention relates to database management operations. More particularly, the invention relates to IMS database operations in which an online DEDB database may be restructured by updating an offline DEDB database with minimal loss of user access time. Examples of IMS DEDB modifications that necessitate a restructure operation include; but are not limited to; increasing or decreasing the number of areas in a database; changing the number of units of work (UOW) contained within an area; changing a database's block size; adding a new segment; increasing a database's maximum segment size; decreasing a database's minimum segment size; changing a database's randomizer function; and changing a database's storage format.

In general, restructure operations in accordance with the invention create an empty, offline DEDB having the desired structure. The offline database is then populated with data from the source (online) database while keeping the source database online (i. e., available for access and update operations). Updates to the source database made during this process are selectively processed in parallel with the offline DEDB load operation. When the contents of the offline database are substantially the same as the source or online database, the source database is taken offline, final updates to the offline database are applied whereafter the offline database is brought online, thereby replacing the source database. It is significant to note that updates occurring to the source or online DEDB are applied to the offline DEDB.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of IMS database design, maintenance and operation having the benefit of this disclosure. Accordingly, the claims appended hereto are not intended to be limited by the disclosed embodiments, but are to be accorded their widest scope consistent with the principles and features disclosed herein.

As a preliminary matter, it is noted that DEDBs may be accessed and updated through one or more IMS database management systems (DBMSs). It is further noted that one or more IMS DBMSs may be grouped into a functional collection referred to as an IMSPlex. It is known in the field of IMS development that an IMSPlex provides mechanisms (e.g., common memory and data) by which events occurring in a first IMS DBMS may be made known to another IMS DBMS.

In general, restructure operations in accordance with the invention may be made to a selected DEDB while it is being updated through a plurality of DBMSs. For simplicity and clarity of exposition, however, a first embodiment: will be described in which a source or online DEDB is being updated by a single IMS DBMS wherein both the source DEDB and an offline restructure operation in accordance with the invention are members of an IMSPlex. Additional discussion, following this initial embodiment, will expand on the principles set forth immediately below.

Referring to FIG. 1, offline restructure operation 100 in accordance with one embodiment of the invention begins by defining one or more changes that are to be made to a currently online DEDB and then allocating the database so defined (block 105). As used herein, the "currently online" database will be referred to as the "source" database (110) and the DEDB allocated in accordance with block 105 will be referred to as the "shadow" database (115). In practice, the structure of source database 110 is often used as a starting point from which to define the structure of shadow database 115. After allocation, storage space for shadow database 115 will have been set aside or made available for use, hut will be void of data.

Once shadow database 115 has been allocated, source database 110 is registered with the IMS DBMS' change capture module so that it will record all updates to the source database and forward the same to offline restructure operation 100 (block 125), the details of which will be described below in connection with FIG. 2. (As used herein, the "change capture module" refers to that capability or function invoked by the IMS CHANGE-CAPTURE-EXIT.)

Once operations in accordance with block 120 complete, population of shadow database 115 with data from source database 110 begins (block 130). Because updates to source database 110 can occur during the act of populating shadow database 115, a check is made to determine if such updates have occurred (block 135). If more than a "sufficiently small" number of updates await to be applied to shadow database 115 (the "NO" prong of block 135), the pending updates are applied to shadow database 115 in accordance with block 130. If a "sufficiently small" number of updates have occurred (the "YES" prong of block. 135), source database 110 is quiesced (block 140) and taken offline (block 145). To be "DONE" in accordance with block 135 means that all of UOWs from source database 110 have been copied into shadow database 115 and that a sufficiently small number of updates await to be applied to shadow database 115. Once offline, any remaining source database updates may be applied to shadow database 115 (block 150), after which shadow database 115 may be swapped for source database 110 (block 155) and then taken online (block 160). The result of which is a "new" online database having the desired structure and the data "old" source database 110 (including updates made to source database 110 during the restructure operation).

As used herein, the phrase "sufficiently small" means that the number of updates are small enough that they may be applied to shadow database 115 within a specified time (i.e., during acts in accordance with block 150). In one embodiment, the specified time may be set such that the amount of time access is denied to the database (i.e., the time it takes to perform blocks 145-155) is less than some acceptable value. For example, if the time it would take to apply the remaining updates to shadow database 115 is such that the time to perform all acts in accordance with blocks 145-155 is less than 5 minutes, the "YES" prong of block 135 is taken. In another embodiment the "specified time" may be defined in terms of the number of updates that need to be applied. For example, if fewer than 1,000 updates remain to be applied to die offline shadow database, the "YES" prong of block 135 is taken.

As described above, the time users are prevented from initiating transactions against a target database in accordance with the invention may be made arbitrarily small by specifying what constitutes a "sufficiently small" number of updates during block 135. Thus, operations in accordance with the invention can restructure an online DEDB by updating an offline DEDB in parallel with continued use of the online DEDB. As a consequence, transaction processing against a target database may be interrupted far less than possible using prior art techniques. As noted previously, this result is provided in part by the ability to apply updates from an online DEDB to an offline DEDB—a capability not provided in the prior art.

In one embodiment of the invention, acts in accordance with block 125 are performed by a change capture module as illustrated in FIG. 2. When an update to online database 110 is performed, that change is communicated to the changing DBMS' change capture module via the IMS CHANGE-CAPTURE-EXIT (block 200). A check is then made to determine if the update is associated with a database that has been registered with the change capture module in accordance with block 120 (block 205). If the update is not directed to the database being restructured—e.g., source database 110 (the "NO" prong of block 205), no further processing is needed and the change capture module exits. If the update is directed to the database being restructured (the "YES" prong of block 205), a further check is made to determine if the update is directed to a specific DEDB area(s) of source database 110 that is being restructured. While restructure operation 100 has been described in terms of restructuring an entire DEDB, it will be recognized that DEDBs are comprised of areas and that one or more such areas may be restructured without restructuring the entire DEDB. Accordingly, actions in accordance with FIG. 1 are applicable to both entire DEDBs and less than entire DEDBs. If the update is directed to an area of the database that is not being restructured (the "NO" prong of block 210), no further processing is needed and the change capture module exits. If the update is directed to an area of source database 110 that is being restructured (the "YES" prong of block 210), yet another check is made to determine if the update completes a transaction, that is, is the update a COMMIT command (block 215).

If the update does not complete a transaction (the "NO" prong of block 215), the update is recorded (block 220) whereafter the change capture module exits. If the update completes a transaction (the "YES" prong of block 215), yet another check is made to determine if the update is directed to an area of source database 110 that has already been processed in accordance with block 130 of FIG. 1 (block 225).

Referring to FIG. 3A, a DEDB (e.g., DEDB-1), as previously noted, may be comprised of a series of areas (e.g., A1→AJ), each of which may be comprised of a series of UOWs (e.g., UOW1→UOWK). In the context of an IMS database, a UOW is a region that is wholly contained within a specified number of storage blocks and which is independent of any other UOW or area within a DEDB. Referring now to 3B, an IMS transaction may comprise a series of one or more updates update-1→update-M) where each update may effect changes to one or more UOWs (e.g., UOW1 and UOWN). Because a DEDB may be comprised on a sequence of areas which, themselves, may be comprised of a sequence of UOWs, a DEDB may be thought of as comprising a single sequence of UOWs as illustrated in FIG. 3C: beginning with the first UOW in the first area (e.g., UOW1 from A1) and ending with the last UOW from the last area (e.g., UOWK from AJ, making a total of (J×K) UOWs).

Referring again to FIG. 2, with respect to block 225, offline restructure operation 100 may load data from source database 110 into shadow database 115 one UOW at a time, beginning with the source database's first UOW in the first area and ending with the source database's last UOW from the last area. If restructure operation 100 communicates to change capture module (via acts in accordance with block 125) that it is currently populating shadow database 115 with UOWx from source database 110 via status message 230, any update associated with any UOW after UOWx would not be "behind" (the "NO" prong of block 225), and may be safely ignored. One reason this may be done is that if the UOW that triggered operations in accordance with block 125 is not behind the UOW being currently copied into shadow database 115. It will be captured when the UOW(s) to which it is directed is copied. On the other hand, if the update that triggered acts in accordance with block 125 is associated with a UOW that is behind the current UOW being copied into shadow database 115—that is, directed to a source UOW that has already been copied into shadow database 115 (the "YES" prong of block 225), all of the updates comprising the transaction may be sent: to restructure operation 190 (block 235). In another embodiment, acts in accordance with block 135 may only send those updates that are associated with UOWs that are "behind" the UOW being currently copied into shadow database 115. (Recall, from above and FIG. 3, a single transaction may comprise updates that modify multiple UOWs; some of which may be "behind" the UOW currently being copied and some may be "ahead." Those UOWs "ahead" need not be processed immediately.)

Figure 4:
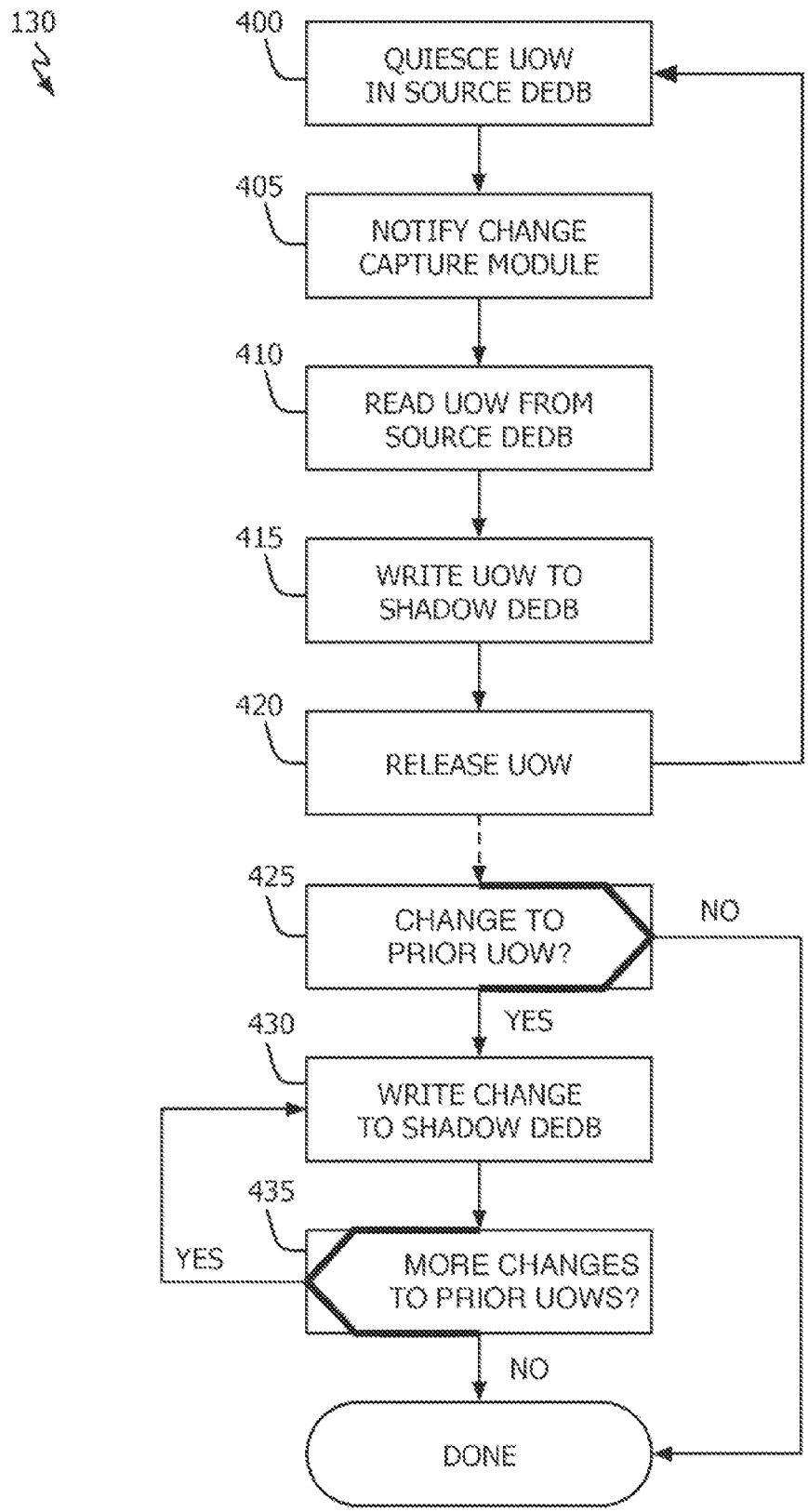
FIG. 4 shows, in flowchart form, a shadow database population operation in accordance with one embodiment of the invention.

Referring to FIG. 4, acts in accordance with block 130 begin by specifying and quiescing a first UOW in source database 110 (block 400) and notifying the change capture module that shadow database 115 is being populated with data from the specified UOW (block 405)—represented in FIG. 1 as a dashed directed line from block 130 to block 125. As used herein, the act of quiescing a UOW means to halt future updates to the UOW and allowing all in-flight transactions against the UOW to complete. Once quiesced, the UOW is read from source database 110 (block 410) and written into shadow database 115 (block 415), after which the source database's UOW is released (block 420). Following acts in accordance with block 420, another source UOW is obtained (if available) as shown by the line from block 420 to block 400.

In addition, and asynchronous to operations in accordance with blocks 400-420; a check is made to determine if a source database UOW that had previously been copied (i.e., during acts in accordance with block 400-420) has been modified (block 425). The asynchronous nature of this operation is indicated by the dashed directed line from block 420 to block 425. If no prior copied UOWs have been modified (the "NO" prong of block 425), no updates need to be applied to shadow database 115. If at lest one prior copied UOW has been modified (the "YES" prong of block 425), the modification(s) is written to shadow database 115 (block 430). Another check is then made to determine if there are any other prior copied UOWs that have been modified (block 435). If there are (the "YES" prong of block 433), those modifications too are written to shadow database 115. If no prior copied UOWs have been modified (the "NO" prong of block 435), no updates need to be applied to shadow database 115.

Figure 5:
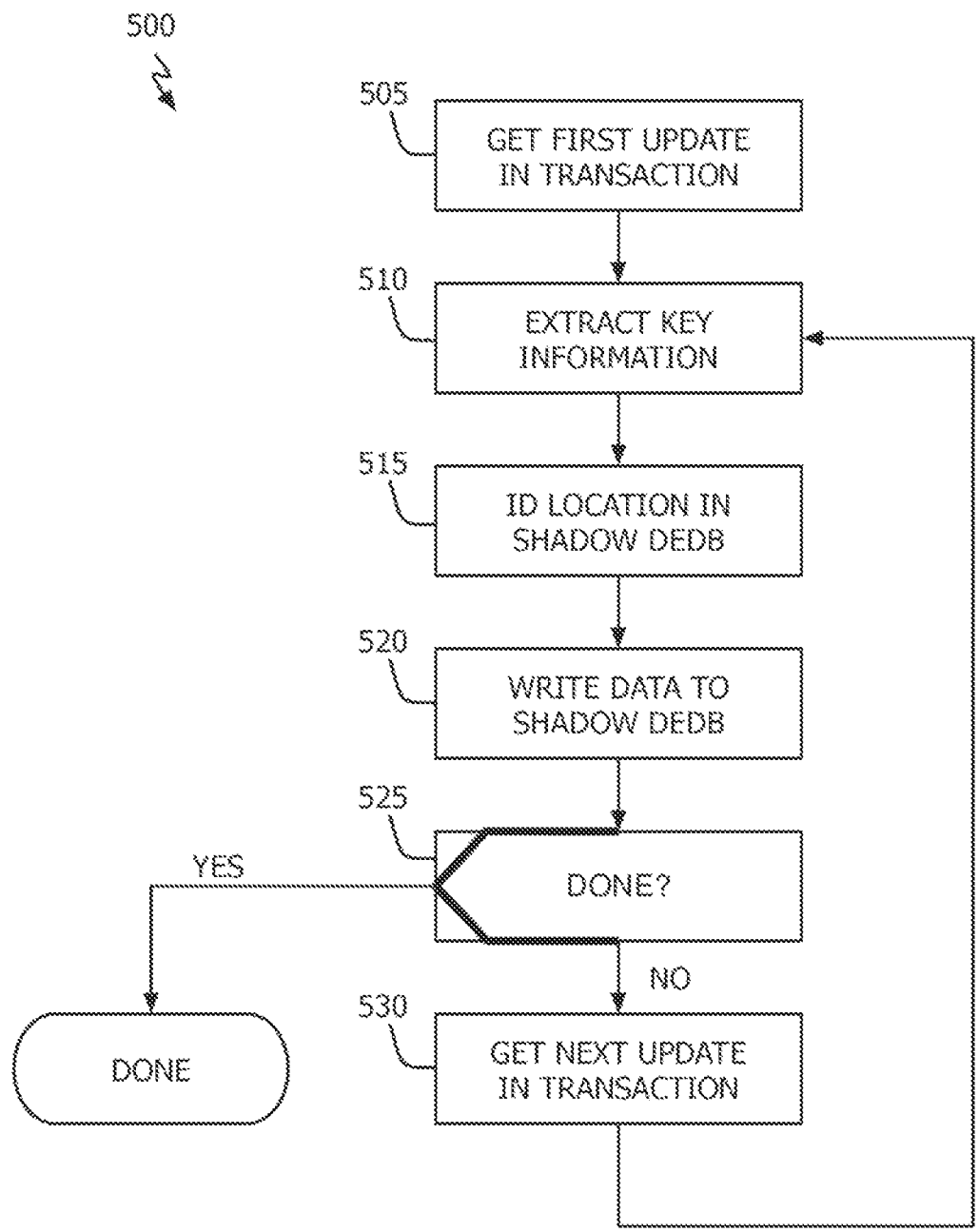
FIG. 5 shows, in flowchart farm, a transaction update operation in accordance with one embodiment of the invention.

Modifications to shadow database 115 in accordance with block 430 are made one update at a time. Recall from above, when a modification is sent to offline restructure operation 100 by an update module, it is in the form of a transaction. A transaction, in turn, is comprised of one or more updates (see FIG. 3B). In one embodiment of the invention, modifications to prior copied UOWs may be processed one transaction at a time as shown in FIG. 5. Illustrative transaction update operation 500 begins by selecting the first update operation in the transaction (block 505). The key associated with the update is then extracted (block 510) and, based on that key, a location at which the updated data is to be stored in shadow database 115 is determined (block 515). As an initial matter, it will be recognized that an "update" identifies a datum within source database 110 that is to be modified, the operation to be performed (e.g., insert a new segment, replace or modify a segment, or delete a segment), the data for the specified operation and, perhaps, other elements not necessary for this discussion. It will also be recognized that the datum is identified by a key (sometimes referred to as a concatenated key) that uniquely identifies where within source database 110 the datum (e.g., node) being updated is located. In one embodiment, the root portion of the key may be used to identify which area and UOW within shadow database 115 that the update is to be applied to; the remaining portion of the key may be used to determine where, within the identified UOW, the update is to be applied. It will be recognized that this approach to mapping data from online DEDB database 110 to offline DEDB database 115 requires that the two databases use the same key structure.

Once the key for the datum being updated has been obtained in accordance with block 510, the key may be applied to a randomizer for shadow database 115. As well be known to those of ordinary skill in the IMS field, randomizing routines determine the location of database records by area within a DEDB and by root anchor point (RAP) within the area. From the randomizer, the unique location in shadow database 115 corresponding to the datum that was updated in source database 110 is identified. This location is used to write data into shadow database 115 (block 520). If additional updates remain to be processed in the current transaction (the "NO" prong of block 525), the next update is obtained (block 530) whereafter operations continue at block 510. If no remaining updates remain to be processed (the "YES" prong of block 525), transaction update operation 500 is complete.

Illustrative insert, replace/update and delete operations in accordance with the invention are set forth in Tables 1 through 3 respectively.

TABLE 1

Illustrative Insert into Shadow Database Operation

Insert( SRC_KEY, DATUM )
{
    Identify area in shadow database 115 ( SRC_KEY )
    Read identified shadow database area TABLE 1-continued Illustrative Insert into Shadow Database Operation

```
If sufficient free space exists
{
    Write DATUM into free space
}
Else
{
    Find needed free space in shadow database 115
        in accordance with IMS practice
    Write DATUM into free space
}
Update shadow database to reflect write operation
}
```

TABLE 2

Illustrative Replace/Update into Shadow Database Operation

```
Replace( SRC_KEY, DATUM )
{
    Identify area in shadow database 115 ( SRC_KEY )
    Read keys from identified shadow database area until the
        segment having the identified key is found(source key as
        transformed by the shadow database's randomizer function)
    If replacement segment for DATUM is smaller that
    original segment
    {
        Replace old segment with DATUM
        Mark unused space as "free"
    }
    Else if replacement segment for DATUM is same size as
        original segment
    {
        Replace old segment with DATUM
    }
    Else // segment for DATUM is larger than original segment
    {
        Find necessary free space in shadow database 115
        Mark original segment as "free"
        Write old segment with new DATUM at newly found location
    }
    Mark segment as modified
}
```

TABLE 3

Illustrative Replace/Update into Shadow Database Operation

```
Delete( SRC_KEY )
{
    Identify segment in shadow database 115 ( SRC_KEY )
    Mark identified segment and all child segments as deleted
    Mark deleted segment(s) as "free"
}
```

With respect to those operations in which storage areas within shadow database 115 are marked as "free," it will be recognized that in current IMS implementations each free space element must be at least 4 bytes long. All freed storage less than 4 bytes is generally marked as "scrap." Individual scrap elements may be reclaimed during, for example, reorganization or defragment operations.

Figure 6:
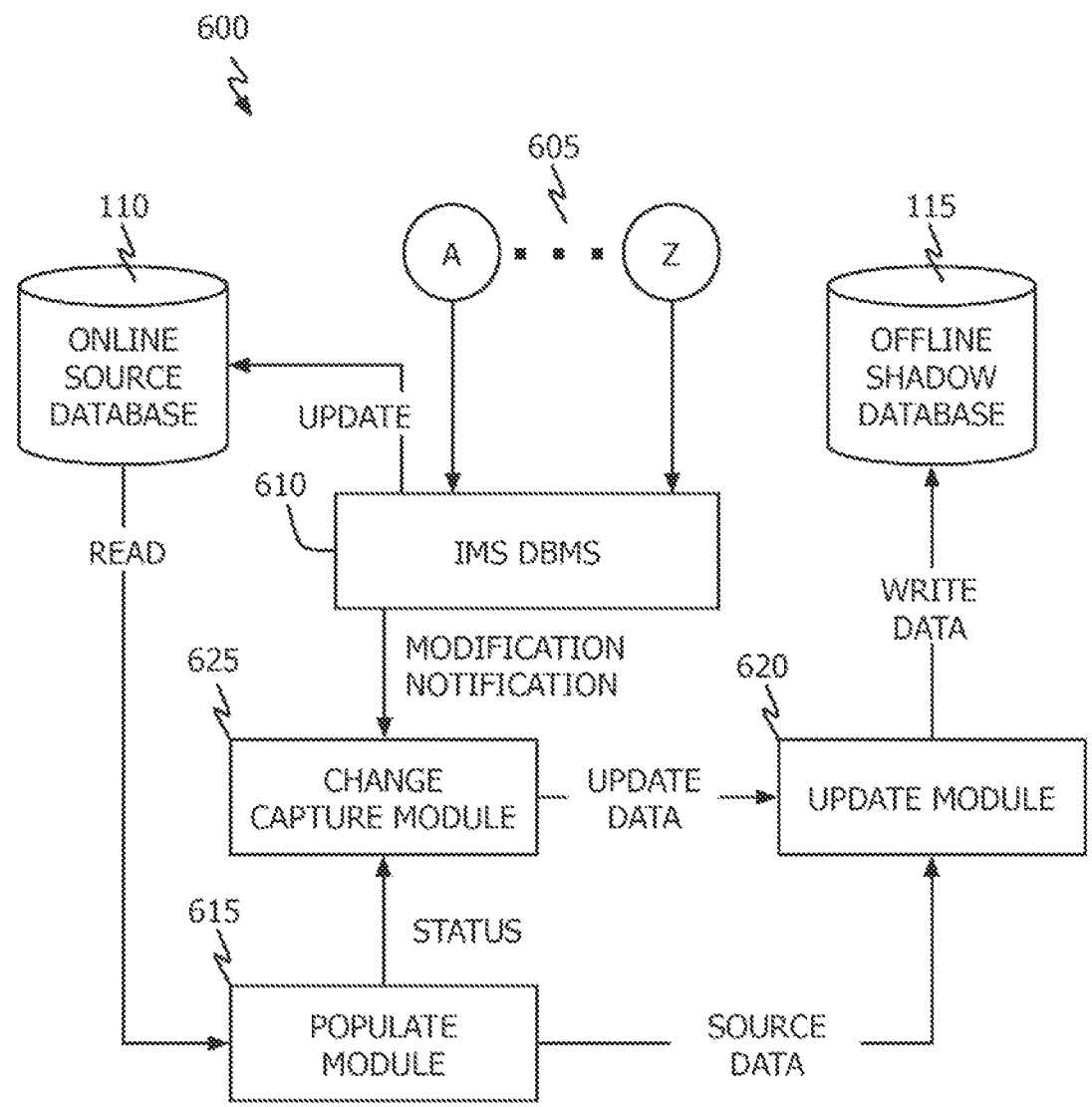
FIG. 6 shows, in block diagram form, a functional model of one system for implementing an offline restructure operation in accordance with one embodiment of the invention.

Referring to FIG. 6, in one embodiment acts in accordance with FIGS. 1, 2, 4 and 5 may be performed by system 600 comprising a plurality of interconnected functional modules. As shown, system 600 comprises applications 605 (e.g., applications A to Z) that interact with DBMS 610 to update source DEDB database 110. Populate module 615 reads data from source database 110 (see FIG. 1 at block 130 and FIG. 4) and sends that data to update module 620 (see FIG. 1 at block 130 and FIGS. 4 and 5) and status notification to change capture module 625 (see FIG. 1 at block 125 and FIG. 2). Update module 620 uses source data provided by populate module 615 and update data provided by change capture module 625 to write data into shadow database 115.

Figure 7:
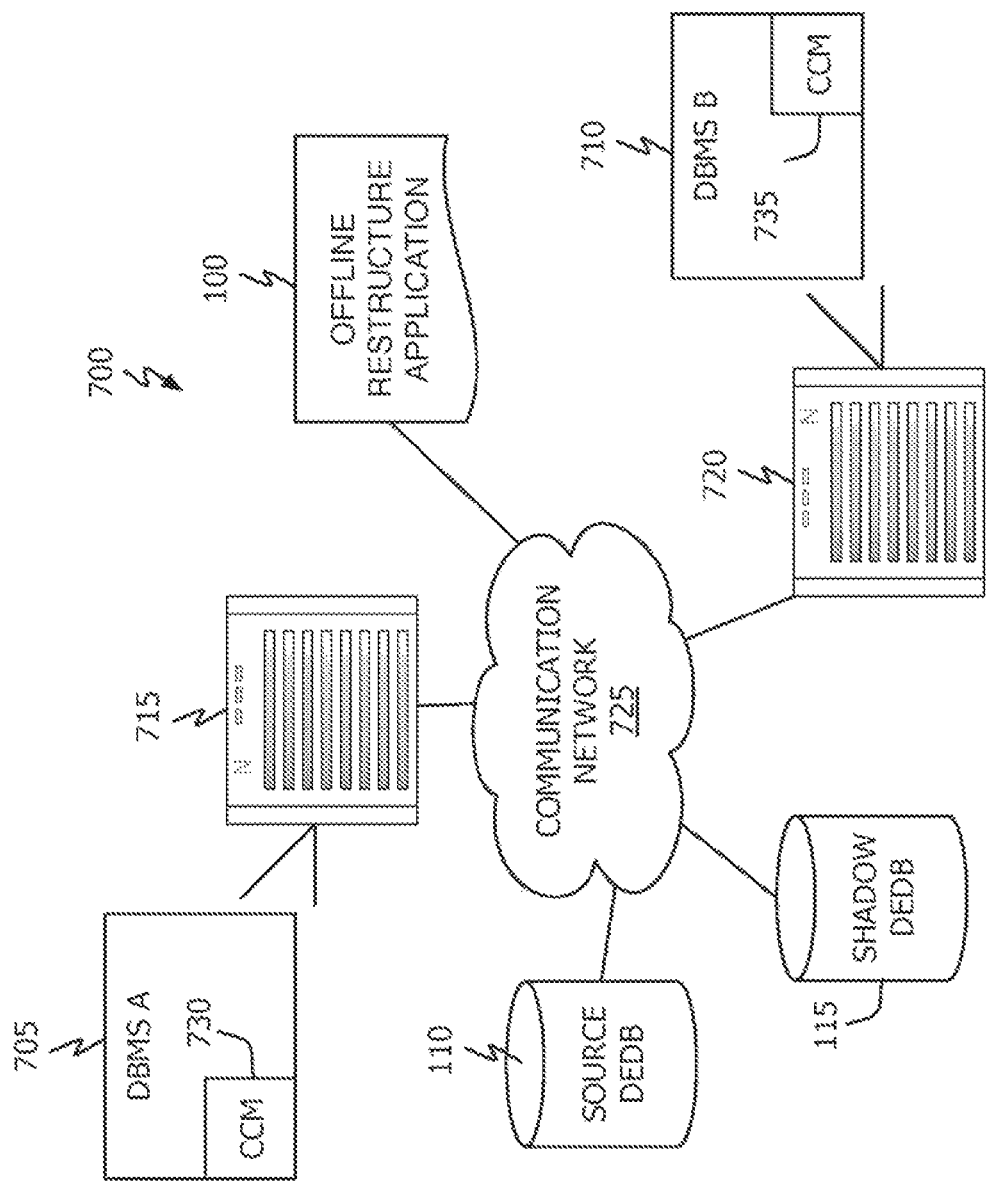
FIG. 7 shows, in block diagram form, a computational environment in which operations in accordance with the invention may operate.

As noted above and illustrated in FIG. 7, offline restructure operation 100 may execute in environment 700 having multiple IMS DBMS' (e.g., 705 and 710), executing on separate computer systems (e.g., 715 and 720), all of which communicate through a communications network (e.g., 725). As shown, each DBMS has a change capture module (e.g., 730 and 735). As shown, source database 110 and shadow database 115 may also be interconnected through network 725, although this is not necessary. For example, shadow database 115 may be directly coupled to offline restructure operation 100. Accordingly, FIG. 7 should be viewed as a functional interconnectivity diagram and not as a requirement that each described element (e.g., shadow database 115 and computer system 715) be physically distinct. In one system in accordance with FIG. 7, offline restructure application 100 and all DBMS' that may update source database 110 (e.g., DBMS' 705 and 710) are members of a common IMSPlex. As such, any time one DBMS updates source database 110, each member of the IMSPlex is so notified. Further, if a new DBMS enters the IMSPlex, or an existing DBMS leaves the IMSPlex, offline restructure application may be so notified.

Various changes in the components as well as in the details of the illustrated operational methods are possible without departing from the scope of the following claims. For instance, in the illustrative system of FIG. 7, each DBMS may execute on a separate computer system or a given computer system may support multiple DBMS'. Further, network 725 may comprise one or more wide area networks (WANs) and/ or one or more local area networks (LANs) and use any suitable technology (e.g., wired or unwired) and protocol (e.g., TCP and IBM's SNA) now known or later developed.

In addition, acts in accordance with FIGS. 1, 2, 4, 5 and 6 may be performed by one or more programmable control devices executing instructions organized into one or more modules (colloquially referred to as programs or applications). As a program(s), offline restructure operation 100 may utilize threads to control various aspects of the described process. For example, the change capture function (e.g., 625) may initiate a thread whenever a COMMIT operation is detected (e.g., from DBMS 610). Similarly, input/output programming that fetches content for shadow database 115 may implement contention mechanisms. By way of example, if a second thread seeks access to block A of shadow database 115 while a first thread is accessing block A, the second thread may block until the first thread completes.

To prevent the situation in which existing applications fail because of database restructuring (e.g., applications 605), some embodiments in accordance with the invention may prohibit such change. Examples of these types of changes include, but are not limited to: changes in key length; the removal of a segment (in some circumstances); changing a non-key segment to a key segment or visa versa; decreasing a database's maximum segment size; and increasing a database's minimum segment size.

The aforementioned programmable control devices may comprise a single computer processor, a special purpose processor, a plurality of processors coupled by a communications link or a custom designed state machine. Custom designed state machines may be embodied in a hardware device such as an integrated circuit including, but not limited to, application specific integrated circuits ("ASIC") or field programmable gate array ("FPGAs"). Storage devices suitable for tangibly embodying program instructions include:

magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices, but exclude transitory propagating signals.

The invention claimed is:

1. A method for changing a randomizer function in a Data Entry Data Base (DEDB), the method comprising:
 registering, using at least one processor, an area of an active DEDB with a change module, the registered area of the active DEDB having a first randomizer function, the first randomizer function being used to determine a location of a database record within the registered area;
 allocating, using the at least one processor, an area for an offline shadow DEDB, the area for the offline shadow DEDB having a second randomizer function that differs from the first randomizer function;
 populating the area of the offline shadow DEDB with data from the registered area of the active DEDB and, during the populating:
  identifying a modification to the active DEDB, and
  in response to determining that the modification is directed to the registered area, reflecting the modification in the offline shadow DEDB;
 replacing the area of the active DEDB with the area of the shadow DEDB; and
 making the area of the shadow DEDB database active.

2. The method of claim 1, wherein the registered area represents less than the entire active DEDB.

3. The method of claim 1, wherein the modification is an update to a first database record at a first location in the registered area and reflecting the modification in the offline shadow DEDB includes using the second randomizer function to determine a second location for the first database record in the area of the offline shadow DEDB.

4. The method of claim 3, wherein reflecting the modification in the offline shadow DEDB further includes:
 determining whether the first location occurs in a unit of work already populated in the offline shadow DEDB;
 ignoring the update when it is determined that the modification does not occur in a unit of work already populated in the offline shadow DEDB; and
 applying the update at the second location in the area of the offline shadow DEDB when the update does occur in a unit of work already populated in the offline shadow DEDB.

5. The method of claim 1, further comprising:
 determining whether a small number of modifications await to be applied to the offline shadow DEDB;
 quiescing the registered area of the active DEDB;
 applying the small number of modifications to the offline shadow DEDB; and
 performing the replacing after applying the small number of modifications.

6. The method of claim 1, wherein reflecting the modification in the offline shadow DEDB includes:
 identifying a key for the modification;
 transforming the key using the second randomizer function to determine a location; and
 writing a database record from the modification at the location.

7. A non-transitory program storage device comprising instructions for causing a programmable control device to perform the method of claim 1.

8. A computer system comprising:
 a first storage device having stored therein an online data entry database (DEDB) having a first area, the first area having a first randomizer function that is used to determine a location of a particular record within the area;
 a database management system (DBMS) communicatively coupled to the first storage device, wherein the DBMS is configured to modify the online DEDB;
 at least one processor; and
 a memory storing instructions that, when executed by at least one processor, cause the computer system to perform operations comprising:
  registering an area of an active DEDB with a change module,
  allocating an offline shadow DEDB having a second area, the second area having a second randomizer function that differs from the first randomizer function,
  populating the second area with data from the registered area while the second area is offline and, during the populating:
   receiving a notification of a modification to the online DEDB from the DBMS, and
   in response to determining that the modification is directed to the registered area, reflecting the modification in the second area,
  replacing the area of the online DEDB with the second area, and
  making the second area active.

9. The computer system of claim 8, wherein the registered area represents less than the entire active DEDB.

10. The computer system of claim 8, wherein populating the second area includes:
 quiescing a first unit of work (UOW) in the area of the active DEDB;
 notifying the change module that the first UOW has been copied to the offline shadow DEDB;
 reading the first UOW from the active DEDB;
 writing the first UOW into the offline shadow DEDB; and
 releasing the first UOW so that it may be updated in the active DEDB.

11. The computer system of claim 8, wherein the modification is an update to a first database record at a first location in the registered area and reflecting the modification in the second area includes using the second randomizer function to determine a second location for the first database record in the second area.

12. The computer system of claim 11, wherein reflecting the modification in the second area further includes:
 determining whether the first location occurs in a unit of work already populated in the offline shadow DEDB;
 ignoring the update when it is determined that the modification does not occur in a unit of work already populated in the offline shadow DEDB; and
 applying the update at the second location in the second area when the update does occur in a unit of work already populated in the offline shadow DEDB.

13. The computer system of claim 8, wherein the instructions further include instructions that, when executed by the at least one processor, cause the computer system to perform operations comprising:
 determining whether a small number of modifications await to be applied to the second area;
 quiescing the registered area of the active DEDB;
 applying the small number of modifications to the second area; and performing the replacing after applying the small number of modifications.

14. The computer system of claim 8, wherein reflecting the modification in the second area includes:
  identifying a key for the modification;
  transforming the key using the second randomizer function to determine a location in the second area; and
  writing a database record from the modification at the location in the second area.

15. The computer system of claim 8, wherein the computer system includes an IMSPlex, where the DBMS is associated with a first computing device of the computer system and the computer system further includes a second DBMS communicatively coupled to the active DEDB and associated with a second computing device and the second DBMS sends the notification of the modification to the active DEDB.

16. A method comprising:
  registering, using at least one processor, a first area of an active DEDB with a change module, the first area of the active DEDB defined as comprised of a first quantity of units of work (UOWs);
  allocating, using the at least one processor, a shadow DEDB having a second area, the second area defined as comprised of a second quantity of UOWs, the second quantity differing from the first quantity;
  populating the second area with data from the first area and, during the populating:
    identifying a modification to the active DEDB, and
    in response to determining that the modification is directed to the first area, reflecting the modification in the second area;
  replacing the first area with the second area; and
  making the second area of the shadow DEDB active.

17. The method of claim 16, wherein the registered area represents less than the entire active DEDB.

18. The method of claim 16, wherein reflecting the modification in the second area includes:
  identifying a key for the modification;
  transforming the key using a randomizer function to determine a location in the second area; and
  writing a database record from the modification at the location in the second area.

19. The method of claim 18, wherein writing the database record occurs while the second area is offline.

20. The method of claim 18, wherein reflecting the modification in the second area further includes:
  determining whether the location is in a unit of work already populated in the second area;
  ignoring the modification when it is determined that the modification does not occur in a unit of work already populated in the second area; and
  applying the modification at the second location in the second area when the update does occur in a unit of work already populated in the second area.

* * * * *